(12) United States Patent
Wang (10) Patent No.: US 8,804,667 B2
(45) Date of Patent: Aug. 12, 2014

(54) METHOD, SYSTEM AND EVOLVED NODEB APPARATUS FOR IMPLEMENTING INTER-EVOLVED NODEB HANDOVER

(75) Inventor: Xintai Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 144 days.

(21) Appl. No.: 13/579,800

(22) PCT Filed: Aug. 11, 2010

(86) PCT No.: PCT/CN2010/075894
§ 371 (c)(1),
(2), (4) Date: Aug. 17, 2012

(87) PCT Pub. No.: WO2011/103738
PCT Pub. Date: Sep. 1, 2011

(65) Prior Publication Data
US 2012/0314689 A1 Dec. 13, 2012

(30) Foreign Application Priority Data
Feb. 25, 2010 (CN) .......................... 2010 1 0122978

(51) Int. Cl.
*H04W 4/00* (2009.01)
*H04L 12/28* (2006.01)
*H04W 36/00* (2009.01)
*H04W 36/12* (2009.01)
*H04W 76/04* (2009.01)

(52) U.S. Cl.
CPC ............ *H04W 36/12* (2013.01); *H04W 76/041* (2013.01)
USPC ........ 370/331; 370/338; 370/395.2; 370/401; 455/432.1; 455/436

(58) Field of Classification Search
CPC ............ H04W 36/00; H04W 36/0005; H04W 36/0011; H04W 36/0016; H04W 36/0022; H04W 36/0033; H04W 36/0055; H04W 36/0066; H04W 36/0072; H04W 36/0083; H04W 36/04; H04W 36/08; H04W 36/12; H04W 36/14; H04W 36/16; H04W 36/32; H04W 36/34; H04W 76/00; H04W 76/002; H04W 76/02; H04W 46/028; H04W 76/064; H04W 4/22; H04W 8/22; H04W 24/00; H04W 28/02; H04W 28/10; H04W 40/36; H04W 48/18; H04W 48/20; H04W 72/02; H04W 92/12; H04W 92/20
USPC ......... 370/328–332, 338, 341, 400–401, 431, 370/437, 439, 464; 455/432.1–444, 455/449–466
See application file for complete search history.

(56) References Cited

U.S. PATENT DOCUMENTS 8,451,800 B2 * 5/2013 Kovvali et al. ................. 370/331
8,477,719 B2 * 7/2013 Ho ................................. 370/331

(Continued)

FOREIGN PATENT DOCUMENTS

| CN | 101656990 A | 2/2010 |
| WO | 20090087099 A1 | 7/2009 |

OTHER PUBLICATIONS

3GPP TSGRAN, Evolved Universal Terrestrial Radio Access Network(E-UTRAN), S1 Application Protocol (S1AP) (Release 9), 3GPP TS 36.413 V9.1.0, Dec. 2009, section 8.4.4.

(Continued)

*Primary Examiner* — Tri H Phan
(74) *Attorney, Agent, or Firm* — Ling Wu; Stephen Yang; Ling and Yang Intellectual Property (57) ABSTRACT

A method, a system and an evolved NodeB (eNB) apparatus for implementing inter-eNB switch are disclosed in the present invention. The method includes: when a user equipment switches from a source-side eNB to a target-side eNB, if the target-side eNB acquires via the Mobility Management Entity (MME) that the Serving Gateway (S-GW) has changed, the target-side eNB adds the new route relation of the S-GW and then updates the General Packet Radio Service (GPRS) Tunnelling Protocol User Plane (GTP-U) entity. The present invention can effectively solve the problem of the uplink data packet loss due to the time difference existing between the update to the Tunnel Endpoint Identifier (TEID) and the routing table by the eNB when inter-eNB switch is performed via X2 and the S-GW has changed, thus enhancing the user experience during the switch.

11 Claims, 3 Drawing Sheets

(56) References Cited

U.S. PATENT DOCUMENTS

| | | | |
|---|---|---|---|
| 8,483,176 B2* | 7/2013 | Sato | 370/331 |
| 2007/0213060 A1* | 9/2007 | Shaheen | 455/436 |
| 2010/0142367 A1* | 6/2010 | Zhang et al. | 370/216 |
| 2011/0002304 A1* | 1/2011 | Lee et al. | 370/331 |
| 2011/0075675 A1* | 3/2011 | Koodli et al. | 370/401 |
| 2012/0082084 A1* | 4/2012 | Balakrishnan et al. | 370/315 |
| 2012/0164979 A1* | 6/2012 | Bachmann et al. | 455/411 |
| 2013/0235845 A1* | 9/2013 | Kovvali et al. | 370/331 |

OTHER PUBLICATIONS

3GPP TSGRAN, Evolved Universal Terrestrial Radio Access (E-UTRA) and Evolved Universal Terrestrial Radio Access Network(E-UTRAN), Overall description, Stage 2 (Release 9), 3GPP TS 36.300 V9.2.0, Dec. 2009, the whole document.

Ericsson, Switching the UL Tunnel Endpoint in the Path Switch Request procedure, 3GPP TSG RAN WG3 Meeting #60, R3-081376, Kansas City, US, May 5-9, 2008, the whole document.

International Search Report for PCT/CN2010/075894 dated Sep. 18, 2010.

* cited by examiner

METHOD, SYSTEM AND EVOLVED NODEB APPARATUS FOR IMPLEMENTING INTER-EVOLVED NODEB HANDOVER

TECHNICAL FIELD

The present invention relates to a method and system for inter-eNB (Evolved NodeB) switch in a communication system, and especially to a method, system and eNB apparatus where switch is implemented between two eNBs via an X2 interface and a S-GW (Serving Gateway) has changed.

BACKGROUND OF THE RELATED ART

In a Long Term Evolution system, based on the resident eNB of the UE (User Equipment), switch is divided into intra-eNB switch and inter-eNB switch. Wherein, intra-eNB switch means that the source cell and the target cell involved in the switch are located in the same eNB; inter-eNB switch means that the source cell and the target cell involved in the switch are located in different eNBs. Based on whether the carrier frequency of the cell before and after switch changes or not, switch is also divided into intra-frequency switch and inter-frequency switch. Based on whether the wireless technique used by the UE before and after switch changes or not, switch is also divided into intra-LTE system switch and inter-LTE system switch. Based on the whether participation of the EPC (Evolved Packet Core) is needed to implement the switch, or based on whether the switch occurs at the S1 interface or the X2 interface, inter-eNB switch is also divided into X2 interface switch and S2 interface switch. Based on whether the S-GW changes during the switch process, switch is also divided into switch with changed S-GW and switch with unchanged S-GW.

The EPC has two core device entities, one being MME (Mobility Management Entity), which is responsible for processing of control-plane signaling; the other one being S-GW, which is responsible for processing of user-plane signaling, and for management of the tunnel (GTP-U, GPRS Tunnelling Protocol User Plane) of the user in the GPRS (General Packet Radio Service). When a user establishes a call, at least one GTP-U tunnel is established between the eNB and S-GW, and one end of the tunnel is on the user plane entity of the eNB, while the other end is on the S-GW. If the user has an inter-S-GW switch, the GTP-U established in the user call needs to be transferred to the new S-GW.

Figure 1:
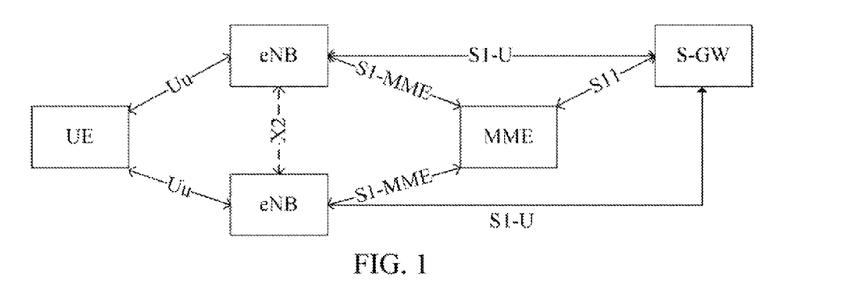
FIG. 1 illustrates the existing interface relationship between a UE, an eNB, a MME and an S-GW.

The connection relationships between UE, eNB, MME and S-GW are as shown in FIG. 1, wherein MME and S-GW are two separate network element entities, the interface between the eNB and MME is called as an S1-MME, and the interface between the eNB and S-GW is called as an S1-U interface. The interface between the UE and the eNB is called as a Un interface. The interface between eNBs is called as an X2 interface, which is a logic interface. The MME and S-GW may also be integrated into one physical network element entity, in which case, the interface between the eNB and the MME is collectively called as an S1 interface (not shown in the figure).

The GTP-U tunnel is managed through a pair of TEIDs (Tunnel End Point Identifiers) and an IP (Internet Protocol) address. Wherein, the TEID pair is used to identify a GTP-U tunnel, and the IP address is used to point out the IP route under the service carried out through the GTP-U tunnel, i.e., the transmission layer address. The TEID at the eNB side in the TEID pair is distributed by the eNB, and a GTP-U entity is established on the user plane; the TEID at the S-GW side in the TEID pair is distributed by the MME (may also be distributed by the S-GW), and a GTP-U entity is established at S-GW side.

When a switch occurs, if the S-GW where the UE is located needs to change, the MME needs to establish a new GTP-U entity using a new TEID on the target S-GW, and deletes the old GTP-U entity on the source-side S-GW. Similarly, when an inter-eNB switch occurs, a new TEID needs to be established for the UE at the target-side eNB, and the TEID of the corresponding service of the user is deleted on the source-side eNB that is switched. During the switch process, the eNB needs to inform the MME of the change of the TEID at the eNB side through a PATH SWITCH REQUEST message, and then inform the S-GW. Similarly, the MME needs to inform the eNB of the change of the TEID at the MME side through a PATH SWITCH REQUEST ACKNOWLEDGE message.

Figure 2:
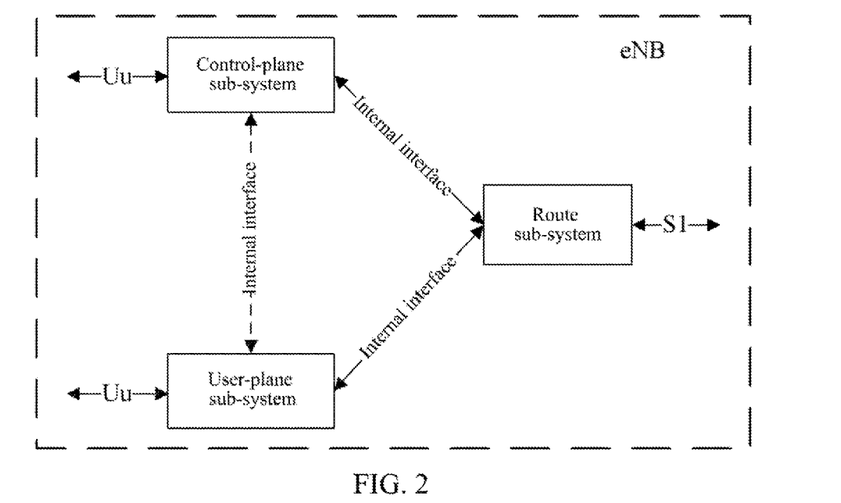
FIG. 2 illustrates the system constitution of the eNB and internal interface relationship.

The structure inside the eNB is as shown in FIG. 2, including a control-plane sub-system, a user-plane sub-system and a route sub-system. Wherein, the control-plane sub-system processes the control-plane signaling, the user-plane sub-system processes the user-plane related signaling, and the route sub-system processes the signaling route and data route through the S1 interface. For the uplink data sent by the eNB to the S-GW, the route sub-system needs to find the next-hop (i.e., the next node) MAC address of the data according to an IP routing table maintained by the route sub-system, and the MAC address is generally the MAC address of the receiving net port of the S-GW network element, or, when there is an intermediate router, is the MAC address of the router.

When the switch between eNBs is an X2 switch, the eNB sends a PATH SWITCH REQUEST message to the MME to request the MME to switch the downlink GTP-U tunnel; after completing the GTP-U tunnel switch of the S-GW, the MME sends a PATH SWITCH REQUEST ACKNOWLEDGE message to the eNB; after the eNB receives the message, the TEID carried in the message needs to be updated if the S-GW has changed.

The method for the eNB to update the TEID in the related art is that the control-plane sub-system notifies the user-plane sub-system to modify the TEID, and meanwhile notifies the route sub-system to modify the IP routing table information. Since there is a time difference between the two operations, packet loss is caused to happen to the uplink data. For example, if the routing table is updated firstly, it may cause the data on the old TEID to be unable to find the uplink route (i.e., unable to identify the updated routing table), thus causing data loss; if the TEID is updated firstly, it will cause the data on the new TEID to be unable to find the uplink route (i.e., unable to identify the old routing table), thus causing data loss. Data loss will cause the application layer to retransmit the data, thus increasing the time delay of data transmission, and decreasing the effective throughput of the system, and hence affecting the service experience of the user during switch.

Therefore, a new and efficient method and system are needed to solve the problem of the uplink data packet loss during switch due to the time difference existing between the update to the Tunnel Endpoint Identifier (TEID) and the routing table by the eNB when inter-eNB switch is performed via X2 and the S-GW has changed.

SUMMARY OF THE INVENTION

The present invention provides a method, a system and an evolved NodeB (eNB) apparatus for implementing inter-eNB switch, which can efficiently avoid occurrence of uplink data packet loss during the switch process when the switch is implemented between eNBs via the X2 interface and the S-GW has changed.

In order to solve the above technical problem, the present invention provides a method for implementing inter-eNB switch, comprising:

when a user equipment switches from a source-side eNB to a target-side eNB, if the target-side eNB acquires via a Mobility Management Entity (MME) that a Serving Gateway (S-GW) has changed, the target-side eNB adding a new routing relation of the S-GW and then updating a General Packet Radio Service (GPRS) Tunnelling Protocol User Plane (GTP-U) entity.

The method may further comprise:

the target-side eNB deleting an old routing relation of the S-GW after successfully completing update of the GTP-U entity.

The step of the target-side eNB acquiring via the MME that the S-GW has changed may comprise:

after completion of the switch, the target-side eNB sending to the MME a message, wherein the message carries evolved radio access bearer (E-RAB) information to be switched for indicating that an Tunnel End Point Identifier (TEID) at the eNB side has changed;

after completion of update of the S-GW, i.e., after completion of switch of all or part of GTP-U tunnels, the MME sending to the target-side eNB a message for indicating whether the S-GW has changed or not according to whether the message carries uplink updated service information;

the target-side eNB checking whether the message sent by the MME carries the uplink updated service information containing the E-RAB information that needs to be updated, if yes, the target-side eNB acquiring that the S-GW has changed; wherein, the E-RAB information comprises one or more of an evolved radio access bearer identity (E-RABID), a transmission layer address and TEID information.

The step of the target-side eNB adding a new routing relation of the S-GW and then updating a GTP-U entity may comprise:

the target-side eNB adding new routing information of the S-GW in a rouging information record according to the TEID and transmission layer address;

updating the GTP-U entity by updating the TEID at the MME side or the S-GW side in a TEID pair of the E-RAB information;

the step of the target-side eNB deleting an old routing relation of the S-GW after successfully completing update of the GTP-U entity may be: if the target-side eNB successfully updates the GTP-U entity, deleting the old routing information of the S-GW from the routing information record.

The method may further comprise: the target-side eNB using updated GTP-U entity and parameters to transmit and receive data.

In order to solve the above technical problem, the present invention also provides a system for implementing inter-eNB switch, comprising a target-side eNB and a Mobility Management Entity (MME), wherein:

the target-side eNB is configured to, after completing a switch of a user equipment (UE) from a source-side eNB, send to the MME a message for notifying that the eNB side has changed; when acquiring via the MME that a Serving Gateway (S-GW) has changed, add a new routing relation of the S-GW and then update a General Packet Radio Service (GPRS) Tunnelling Protocol User Plane (GTP-U) entity;

the MME is configured to, after completing update of the S-GW, inform the target-side eNB of whether the S-GW has changed or not.

The target-side eNB may further be configured to delete an old routing relation of the S-GW after successfully completing update of the GTP-U entity.

The target-side eNB may further be configured to acquire via the MME that the S-GW has changed in the following way:

carrying evolved radio access bearer (E-RAB) information to be switched in the message sent to the MME for indicating that an Tunnel End Point Identifier (TEID) at the eNB side has changed; if it is checked that the message returned by the MME carries uplink updated service information containing the E-RAB information that needs to be updated, acquiring that the S-GW has changed, wherein the E-RAB information comprises one or more of an evolved radio access bearer identity (E-RABID), a transmission layer address and TEID information;

the MME may further be configured to inform the target-side eNB of whether the S-GW has changed or not in the following way: after successfully completing update of the S-GW, i.e., after successfully completing switch of all or part of GTP-U tunnels, sending to the target-side eNB a message for indicating whether the S-GW has changed or not according to whether the message carries the uplink updated service information.

The target-side eNB may also be configured to add a new routing relation of the S-GW and then update the GTP-U entity in the following way: adding new routing information of the S-GW in a rouging information record according to the TEID and transmission layer address; updating the GTP-U entity by updating the TEID at the MME side or the S-GW side in a TEID pair of the E-RAB information; and the target-side eNB is configured to delete an old routing relation of the S-GW in the following way: if the GTP-U entity is successfully updated, deleting the old routing information of the S-GW from the routing information record.

The target-side eNB may further be configured to use updated GTP-U entity and parameters to transmit and receive data.

In order to solve the above technical problem, the present invention also provides an evolved NodeB (eNB) apparatus for implementing inter-eNB switch, comprising a control-plane sub-system, a user-plane sub-system and a route sub-system, wherein, the control-plane sub-system is configured to, after completing a switch of a user equipment (UE) from a source-side eNB, when acquiring via a Mobility Management Entity (MME) that a Serving Gateway (S-GW) has changed, notify the route sub-system to add a new routing relation and then notify the user-plane sub-system to update a General Packet Radio Service (GPRS) Tunnelling Protocol User Plane (GTP-U) entity;

the route sub-system is configured to add new routing information of the S-GW according to a notification of the control-plane sub-system;

the user-plane sub-system is configured to update the GTP-U entity according to a notification of the control-plane sub-system.

The user-plane sub-system may further be configured to return an update result to the control-plane sub-system after completing update of the GTP-U entity;

the control-plane sub-system may further be configured to notify the route sub-system to delete old routing information of the S-GW if judging that the update result returned by the user-plane sub-system is "successful"; and notify the route sub-system to delete added new routing information of the S-GW if judging that the update result is "unsuccessful";

the route sub-system may further be configured to delete old routing information of the S-GW or add new routing information of the S-GW in a routing information record.

The control-plane sub-system may further be configured to acquire via the MME that the S-GW has changed in the following way: after completion of the switch of the UE from the source-side eNB, sending to the MME a message carrying evolved radio access bearer E-RAB information to be switched for indicating that an Tunnel End Point Identifier (TEID) at the eNB side has changed; if it is checked that the message returned by the MME carries uplink updated service information containing the E-RAB information that needs to be updated, acquiring that the S-GW has changed, and the E-RAB information comprising one or more of an evolved radio access bearer identity (E-RABID), a transmission layer address and TEID information;

the route sub-system may be configured to add new routing information of the S-GW in a rouging information record according to the TEID and transmission layer address carried in the message of the control-plane sub-system;

the user-plane sub-system may be configured to update the GTP-U entity in the following way: updating the TEID at the MME side or the S-GW side in a TEID pair of the E-RAB information and a target address according to the TEID and transmission layer address carried in the message of the control-plane sub-system.

The user-plane sub-system may further be configured to use updated GTP-U entity and parameters to transmit and receive data.

Compared with the prior art, by the method of firstly adding routes by the eNB, then updating the GTP-U entity, and deleting the old route after obtaining a result of successful GTP-U update, the method, system and apparatus provided in the present invention effectively solve the problem of the uplink data packet loss during switch due to the time difference existing between the update to the Tunnel Endpoint Identifier (TEID) and the routing table by the eNB when inter-eNB switch is performed via X2 and the S-GW has changed, thus enhancing the user experience during the switch.

PREFERRED EMBODIMENTS OF THE PRESENT INVENTION

The technical scheme of the present invention will be expounded below in detail with reference to the drawings and the preferred examples. The examples listed below are only used to describe and explain the present invention, rather than to limit the technical scheme of the present invention.

The method example for implementing inter-eNB switch provided by the present invention comprises:

when a user equipment (UE) switches from a source-side eNB (eNB1) to a target-side eNB (eNB2) through an X2 interface, if eNB2 acquires via a Mobility Management Entity (MME) that a S-GW has changed, eNB2 adding a new routing relation and then updating a GTP-U entity, i.e. updating the Tunnel End Point Identifier (TEID) and target address of the GTP-U; and deleting the old routing relation after the GTP-U entity is successfully updated.

Figure 3:
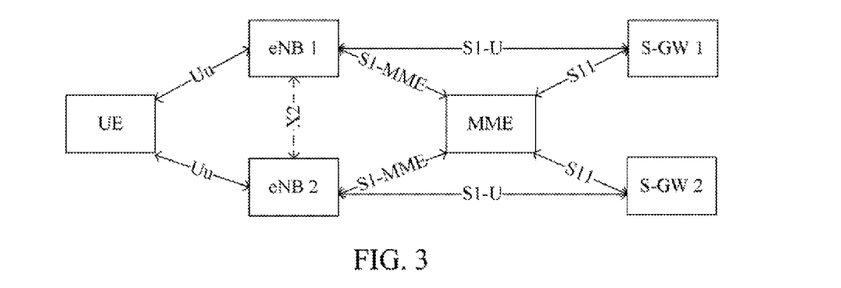
FIG. 3 illustrates the interface relationship between various network elements in the system example where the switch occurs between eNBs and the S-GW has changed according to the present invention.

As shown in FIG. 3, it shows the system example for implementing inter-eNB switch of the present invention, which comprises a target-side eNB and a Mobility Management Entity (MME), wherein:

the target-side eNB is configured to, after completing a switch of a user equipment (UE) from a source-side eNB, when acquiring via the MME that a Serving Gateway (S-GW) has changed, add a new routing relation and then update the GTP-U entity; delete the old routing relation after the GTP-U entity is successfully updated;

the target-side eNB sends to the MME a PATH SWITCH REQUEST message, which carries the Evolved Radio Access Bearer (E-RAB) information to be switched and includes but not limited to E-RAB Identity (E-RABID), transmission layer address (i.e., the IP address) and TEID information, to indicate that the TEID of the MME side has changed.

The target-side eNB updates the GTP-U entity by updating the Tunnel End Point Identifier (TEID) of the GTP-U and the target address after adding the new routing relation.

The MME is configured to, after completing update of the S-GW, inform the target-side eNB of whether the S-GW has changed or not.

After completing update of the S-GW, i.e., completing switch of all or part of GTP-U tunnels, the MME sends to the eNB2 a PATH SWITCH REQUEST ACKNOWLEDGE message for indicating that the S-GW has changed by including the updated E-RAB information in the message.

The inside of the target-side eNB is as shown in FIG. 2, comprising a control-plane sub-system, a user-plane sub-system and a route sub-system, wherein, the control-plane sub-system is configured to, when acquiring from the E-RAB information (including but not limited to E-RABID, transmission layer address information and TEID information) in the message sent from the MME that the S-GW has changed, notify the route sub-system to add a new route information and then notify the user-plane sub-system to update the GTP-U entity; notify the route sub-system to delete old routing information according to the update success result notified by the user-plane sub-system;

the route sub-system is configured to add IP routing information of the target-side S-GW or delete the IP routing information of the source-side S-GW in the routing table according to the IP address of the transmission layer carried in the notification;

the user-plane sub-system is configured to update the TEID at the S-GW side or the MME side in the TEID pair of the E-RAB information and a target IP address according to the notification, and inform the control-plane sub-system of the update result: GTP-U entity update is successful, or GTP-U entity update fails.

Figure 4:
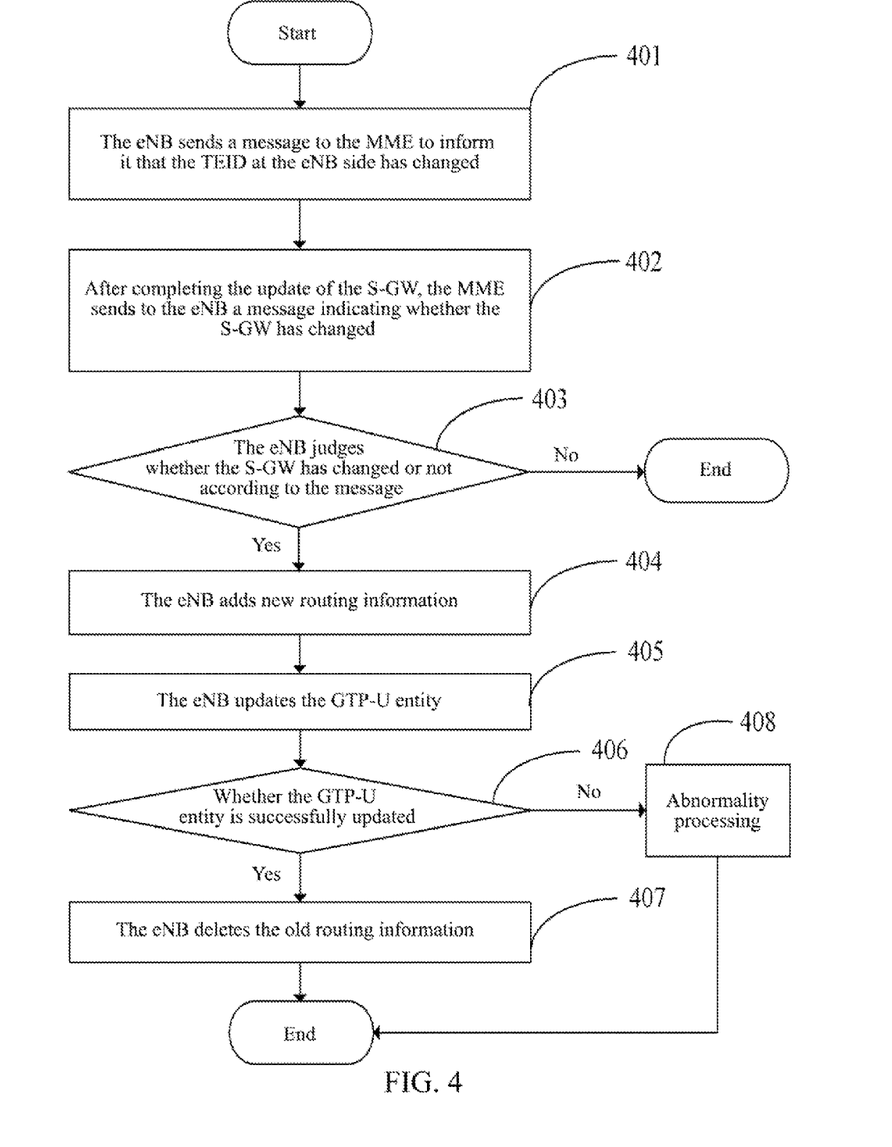
FIG. 4 is a flowchart of the method example where the switch occurs between eNBs and the S-GW has changed according to the present invention.

FIG. 4 is a flowchart of the method example for implementing inter-eNB switch, which is implemented through interaction between the target-side eNB (eNB2, called as eNB in short) and MME, and comprises the following steps:

401: after the UE switches to the eNB via the X2 interface, the eNB sends a message to the MME to inform it that the TEID at the eNB side has changed;

the eNB sends to the MME a PATH SWITCH REQUEST message, which carries the Evolved Radio Access Bearer (E-RAB) information to be switched, including but not limited to, E-RAB Identity (E-RABID), TEID information and transmission layer address information (i.e. IP address), to indicate that the TEID at the eNB side has changed.

402: After completing the update of the S-GW, the MME sends to the eNB a message indicating whether the S-GW has changed;

if the MME successfully switches the GTP-U tunnels (successfully switches all or part of the GTP-U tunnels), i.e., successfully completing the update of the S-GW, the MME sends to the eNB a PATH SWITCH REQUEST ACKNOWLEDGE message, which carries uplink updated service information to indicate that the S-GW has changed. If the MME fails to switch the GTP-U tunnels (fails to switch all or part of the GTP-U tunnels), then it enters a routine abnormality processing.

403: The eNB judges whether the S-GW has changed or not according to the message, if yes, execute step 404, otherwise, end the flow;

the eNB checks whether the message sent by the MME carries the uplink updated service information through the control-plane sub-system, i.e., whether the message contains the E-RAB information to be updated, which includes but not limited to, E-RABID, transmission layer address information and TEID information, to indicate that the S-GW has changed.

If the control-plane sub-system of the eNB detects that the message does not carry the E-RAB information, which suggests that the S-GW after X2 switch does not change, and the eNB does not need to make the modification information of the GTP-U tunnels, then the flow is ended. If the control-plane sub-system of the eNB detects that the message carries the E-RAB information, which suggests that the S-GW after X2 switch has changed, then the next step is performed.

404: The eNB adds new routing information;

the control-plane sub-system of the eNB notifies the route sub-system via an internal interface to add new routing information; the route sub-system adds one piece of IP routing information in the routing table according to the TEID and transmission layer address (IP address), and the MAC address of the next hop of the uplink data packet of the TEID can be found through the IP routing information. At this moment, the E-RAB information has two pieces of IP routing information of the S-GW side, one being the IP routing information of the old S-GW (i.e., the source-side S-GW), and the other one being the IP routing information of the new S-GW (i.e., the target-side S-GW). Addition of the IP routing information by the route sub-system may be implemented with the aid of, but not limited to, ERABID or TEID information.

405: The eNB updates the GTP-U entity;

the control-plane sub-system of the eNB notifies, via an internal interface, the user-plane sub-system to update the GTP-U entity;

the user-plane sub-system updates the TEID of the S-GW side in the TEID pair in the E-RAB information and the target IP address, i.e., updates the GTP-U entity, and the subsequent uplink data packets will be transmitted in the uplink through the new target TEID and new IP address. The user-plane sub-system informs, via an internal interface, the control-plane sub-system of the update result: update of the GTP-U entity succeeds, or update of the GTP-U entity fails.

In this step, the operation of the user-plane sub-system updating the TEID of the S-GW side in the TEID pair and the target IP address may be implemented with the aid of, but not limited to, parameters including E-RABID and/or Radio Bearer Identity (RBID).

In this step, the method of the user-plane sub-system updating the GTP-U entity may be implemented by, but not limited to, firstly establishing a new entity and then deleting the old entity, or by directly modifying the related parameters on the old entity. Moreover, when the user-plane sub-system updates the GTP-U entity, the upload of the uplink data packet may be suspended (compatible with the existing method) or may not be suspended.

After update of the GTP-U entity is completed, the user-plane sub-system uses the new GTP-U entity and parameters to transmit and receive data.

406: Whether the GTP-U entity is successfully updated, if yes, execute the following steps, otherwise proceed to step 408 to perform abnormality processing;

the control-plane sub-system of the eNB judges whether the update result is "successful" or not, if yes, execute the following steps, otherwise, proceed to step 408 to perform abnormality processing;

if the user-plane sub-system fails to update the GTP-U entity, the control-plane sub-system of the eNB notifies, via an internal interface, the route sub-system to delete the newly added IP routing information, and execute the subsequent abnormality processing and then end the flow.

407: The eNB deletes the old routing information, and ends the flow.

If the user-plane sub-system successfully updates the GTP-U entity, the control-plane sub-system notifies, via an internal interface, the route sub-system to delete the old IP routing information.

Through the execution of the above steps, after an inter-eNB X2 switch, the UE can ensure that no packet of the uplink data will be lost at the eNB side in the event that the S-GW has changed.

APPLICATION EXAMPLE 1

Figure 5:
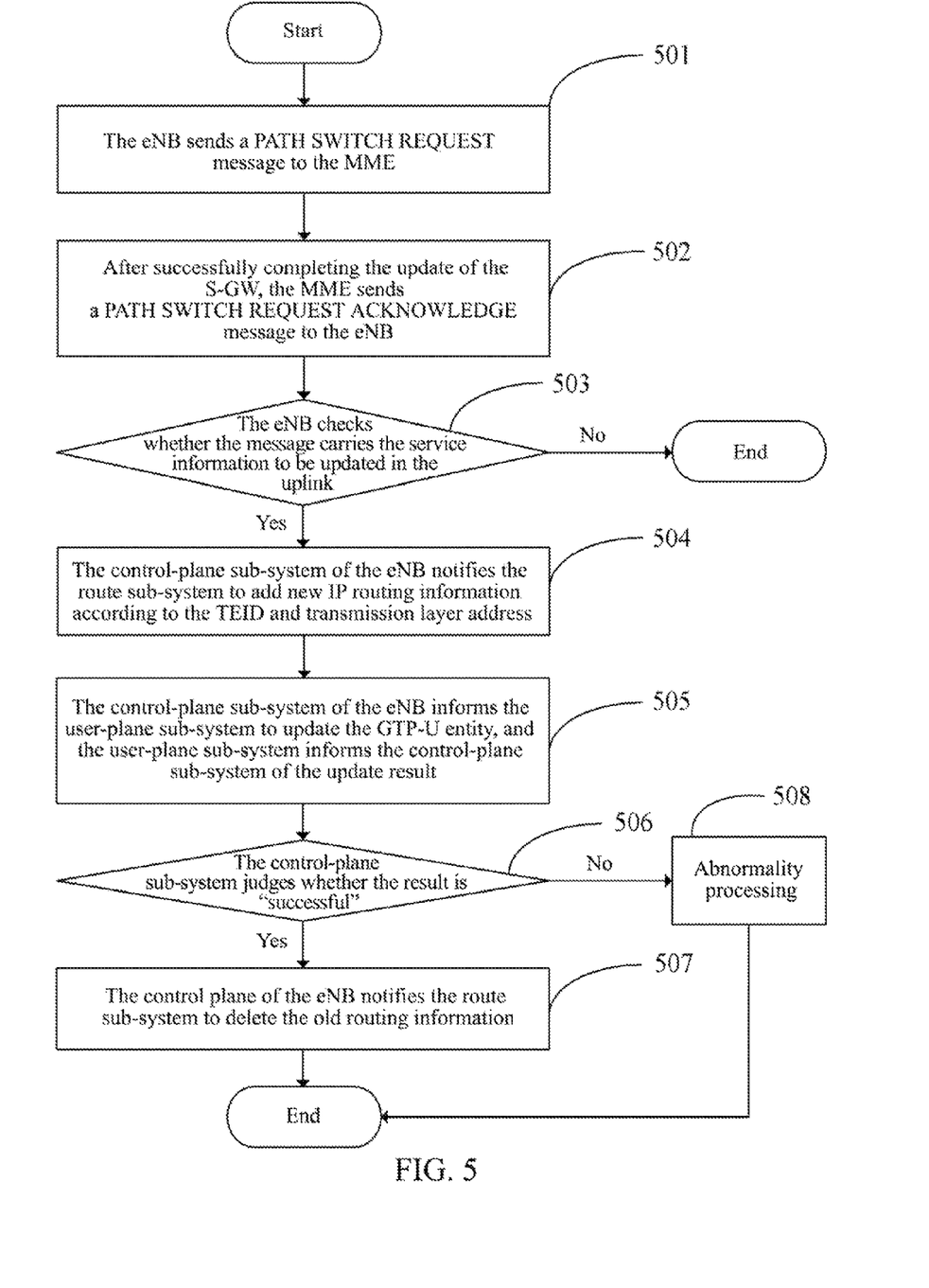
FIG. 5 is a flowchart of an application example of the method example as shown in FIG. 4.

The application example of the method for implementing inter-eNB switch as follows is completed through interaction between the target-side eNB and MME and between sub-systems within the eNB. Without loss of generality, after the UE switches to the eNB via an X2 interface, the manner of updating the GTP-U by the user-plane sub-system of the eNB is to firstly establish a new GTP-U entity and then delete the old GTP-U entity. It is assumed that the UE has an E-RAB, and the corresponding E-RABID is 3. In the TEID pair of the GTP-U distributed by the target eNB, the TEID at the eNB side is 34, and the TEID at the MME side is 55. It is assumed that the internal interface between the control-plane sub-system and the route sub-system is a function interface, and the internal interface between the control-plane sub-system and the user-plane sub-system is a message interface.

501: After completing the X2 switch at the radio side, the eNB sends a PATH SWITCH REQUEST message to the MME;

the E-RABID to be switched in the downlink carried in the message is 3, the transmission layer address is 145.23.123.2, and the GTP-TEID is 34.

502: After successfully completing the update of the S-GW, the MME sends a PATH SWITCH REQUEST ACKNOWLEDGE message to the eNB;

if the MME fails to successfully complete the switch of all or part of the GTP-U tunnels, i.e., the S-GW does not change, then the message does not carry the service information that needs to be switched in the uplink, the TEID at the eNB side corresponding to the service with the E-RABID being 3 stored by the MME and S-GW changes to 34, the transmission layer IP address is 145.23.123.2, and the TEID at the MME side is still 55.

In this application example, the MME successfully completes the switch of all or part of the GTP-U tunnels, i.e., the S-GW has changed, the service information to be switched in the uplink carried in the message is as follows: the E-RABID is 3, the TEID at the MME side is 66, and the transmission layer address is 145.23.145.11.

503: The control-plane sub-system of the eNB checks whether the PATH SWITCH REQUEST ACKNOWLEDGE message carries the service information to be updated in the uplink, if yes, execute step 504, otherwise end the flow;

in this application example, the message carries the service information to be updated in the uplink (the key parameters are as described in step 502), which indicates that the S-GW changes.

504: The control-plane sub-system of the eNB notifies the route sub-system to add new IP routing information according to the TEID and transmission layer address;

the control-plane sub-system of the eNB invokes the function interface to notify the route sub-system to add an IP route under the service whose E-RABID is 3, the IP address is 145.23.123.2, and the TEID at the eNB corresponding to the service is 34.

505: The control-plane sub-system of the eNB sends a GTP entity update request message to the user-plane sub-system to inform the user-plane sub-system to update the GTP-U entity; the user-plane sub-system feeds back the update result to the control-plane sub-system through a GTP entity update response message;

the E-RABID carried in the GTP entity update request message is 3, the new TEID at the MME side is 66, and the transmission layer address is 145.13.145.11.

After receiving the request message, the user-plane sub-system uses the service whose E-RABID is 3 for index to find out the old TEID pair and the old IP address under the service, and establish new TEID pair and IP address under the service index, wherein the TEID at the eNB side in the new TEID pair is still 34, and the TEID at the MME side is 66; the new IP address is 145.13.145.11; and then the configuration is made to take effect immediately.

The user-plane sub-system feeds back the result of update success or failure to the control-plane sub-system.

506-508: The control-plane sub-system of the eNB performs processing according to the update result of the user-plane sub-system: if the update result is "successful", it notifies the route sub-system to delete the old routing information; if the update result is "failure", it notifies the route sub-system to delete the routing information added in step 504, and proceeds to abnormality processing.

Thereby, the update process of the GTP-U entity triggered by the UE switching to the eNB via an X2 interface and the S-GW changing is completed. In this switch process, packet loss of the uplink data can be efficiently avoided.

APPLICATION EXAMPLE 2

The application example of the method for implementing inter-eNB switch as follows is completed through interaction between the target-side eNB and MME and between sub-systems within the eNB. Without loss of generality, after the UE switches to the eNB via an X2 interface, the manner of updating the GTP-U by the user-plane sub-system of the eNB is to directly perform update using the old GTP-U entity (i.e., directly modifying related parameters on the old entity). It is assumed that the UE has two E-RABs (i.e., two services are implemented simultaneously), and the corresponding E-RABIDs are 3 and 4. In the TEID pair of the GTP-U distributed by the target eNB, the TEID at the eNB side corresponding to the E-RABID of 3 is 34, and the TEID at the MME side is 55. The TEID at the eNB side corresponding to the E-RABID of 4 is 44, and the TEID at the MME side is 66; it is assumed that the internal interface between the control-plane sub-system and the route sub-system is a function interface, and the internal interface between the control-plane sub-system and the user-plane sub-system is a message interface.

501': After completing the X2 switch at the radio side, the eNB sends a PATH SWITCH REQUEST message to the MME;

the E-RABID to be switched in the downlink carried in the message is 3, the transmission layer address is 145.23.123.2, and the GTP-TEID is 34; the other service E-RABID to be switched in the downlink carried in the message is 4, the transmission layer address is 145.23.123.3, and the GTP-TEID is 44.

502': After successfully completing the update of the S-GW, the MME sends a PATH SWITCH REQUEST ACKNOWLEDGE message to the eNB;

it is assumed in the application example that the S-GW has changed, and the it is assumed that the service information to be switched in the uplink is as follows: the E-RABID is 4, the TEID at the MME side is 77, and the transmission layer address 145.23.145.12; the E-RABID is 3, and if the switch at the S-GW fails, this is also told to the eNB in the message.

503': The control-plane sub-system of the eNB checks whether the PATH SWITCH REQUEST ACKNOWLEDGE message carries the service information to be updated in the uplink, if yes, execute step 504', otherwise end the flow;

the key parameters in the service information to be updated in the uplink are as described in the step 402".

504': The control-plane sub-system of the eNB notifies the route sub-system to add new IP routing information according to the TEID and transmission layer address;

the control-plane sub-system of the eNB invokes the function interface to notify the route sub-system to add an IP route under the service whose E-RABID is 4, the IP address is 145.23.123.3; the TEID at the eNB corresponding to the service is 44.

In step 503': since the PATH SWITCH REQUEST ACKNOWLEDGE message carries the E-RABID of 3 that fails in switch, the control-plane sub-system of the eNB will initiate release of E-RAB after completion of the switch.

505': The control-plane sub-system of the eNB sends a GTP entity update request message to the user-plane sub-system to inform the user-plane sub-system to update the GTP-U entity; the user-plane sub-system feeds back the update result to the control-plane sub-system through a GTP entity update response message;

The E-RABID carried in the GTP entity update request message is 4, the new TEID at the MME side is 77, and the transmission layer address is 145.13.145.12.

After receiving the message, the user-plane sub-system uses the service whose E-RABID is 4 for index, and stops data transmission on the TEID, and modifies the TEID at the MME side in the TEID pair to be 77; the new IP address is 145.13.145.12; then the configuration is made to take effect immediately, and uplink data transmission is started.

The user-plane sub-system feeds back the result of update success or failure to the control-plane sub-system through a GTP entity update response message.

506'~508': The control-plane sub-system of the eNB performs processing according to the update result of the user-plane sub-system: if the update result is "successful", it deletes the old routing information; if the update result is "failure", it deletes the routing information added in step 404", and proceeds to abnormality processing.

Thereby, the update process of the GTP-U entity triggered by the UE switching to the eNB via an X2 interface and the S-GW changing is completed. In this switch process, packet loss of the uplink data can be efficiently avoided.

As can be seen from the above examples and application examples, by the method of firstly adding routes by the eNB, then updating the GTP-U entity, and deleting the old route after obtaining a result of successful GTP-U update, the present invention effectively solves the problem of the uplink data packet loss during switch due to the time difference existing between the update to the Tunnel Endpoint Identifier (TEID) and the routing table by the eNB when inter-eNB switch is performed via X2 and the S-GW has changed, thus enhancing the user experience during the switch.

Of course, the present invention may have many other examples, and a person having ordinary skill in the art can make various corresponding modifications or variations to the present invention without departing from the spirit and essence of the present invention. However, any modification, equivalent replacement, or improvement made within the spirit and essence of the present invention shall fall into the protection scope of the present invention.

Industrial Applicability

Compared with the prior art, the present invention effectively solves the problem of the uplink data packet loss during switch due to the time difference existing between the update to the Tunnel Endpoint Identifier (TEID) and the routing table by the eNB when inter-eNB switch is performed via X2 and the S-GW has changed, thus enhancing the user experience during the switch.

What is claimed is:

1. A method for implementing inter-eNB switch, comprising the following steps of:
   when a user equipment switches from a source-side eNB to a target-side eNB, the target-side eNB, after the switch is completed, sending to a Mobility Management Entity (MME) a PATH SWITCH REQUEST message to indicate that the eNB side has changed;
   the MME, after completing update of the S-GW, sending to the target-side eNB a PATH SWITCH REQUEST ACKNOWLEDGE message for indicating whether a Serving Gateway(S-GW) has changed or not;
   if the target-side eNB acquires via the MME that the S-GW has changed, the target-side eNB adding a new routing relation of the S-GW and then updating a General Packet Radio Service(GPRS) Tunnelling Protocol User Plane (GTP-U) entity; and
   the target-side eNB deleting an old routing relation of the S-GW after successfully completing update of the GTP-U entity.

2. The method according to claim 1, wherein, the PATH SWITCH REQUEST message carries evolved radio access bearer (E-RAB) information to be switched for indicating that a Tunnel End Point Identifier (TEID) at the eNB side has changed;
   after completion of update of the S-GW, i.e., after completion of switch of all or part of GTP-U tunnels, the MME sends to the target-side eNB the PATH SWITCH REQUEST ACKNOWLEDGE message for indicating whether the S-GW has changed or not according to whether the PATH SWITCH REQUEST ACKNOWLEDGE message carries uplink updated service information;
   the step of the target-side eNB acquiring via the MME that the S-GW has changed comprises:
   the target-side eNB checking whether the PATH SWITCH REQUEST ACKNOWLEDGE message sent by the MME carries the uplink updated service information containing the E-RAB information that needs to be updated, if yes, the target-side eNB acquiring that the S-GW has changed; wherein,
   the E-RAB information comprises one or more of an evolved radio access bearer identity (E-RABID), a transmission layer address and TEID information.

3. The method according to claim 2, wherein, the step of the target-side eNB adding a new routing relation of the S-GW and then updating a GTP-U entity comprises:
   the target-side eNB adding new routing information of the S-GW in a rouging information record according to the TEID and transmission layer address;
   updating the GTP-U entity by updating the TEID at the MME side or the S-GW side in a TEID pair of the E-RAB information;
   the step of the target-side eNB deleting an old routing relation of the S-GW after successfully completing update of the GTP-U entity is: if the target-side eNB successfully updates the GTP-U entity, deleting the old routing information of the S-GW from the routing information record.

4. The method according to claim 3, further comprising: the target-side eNB using updated GTP-U entity and parameters to transmit and receive data.

5. A system for implementing inter-eNB switch, comprising a target-side eNB and a Mobility Management Entity (MME), wherein:
   the target-side eNB is configured to, after completing a switch of a user equipment (UE) from a source-side eNB, send to the MME a message for notifying that the eNB side has changed; when acquiring via the MME that a Serving Gateway(S-GW) has changed, add a new routing relation of the S-GW and then update a General Packet Radio Service (GPRS) Tunnelling Protocol User Plane (GTP-U) entity, and delete an old routing relation of the S-GW after successfully completing update of the GTP-U entity;
   the MME is configured to, after completing update of the S-GW, send to the target-side eNB a message to inform the target-side eNB of whether the S-GW has changed or not.

6. The system according to claim 5, wherein,
   the target-side eNB is configured to acquire via the MME that the S-GW has changed in the following way:
   carrying evolved radio access bearer (E-RAB) information to be switched in the message sent to the MME for indicating that a Tunnel End Point Identifier (TEID) at the eNB side has changed; if it is checked that the message returned by the MME carries uplink updated service information containing the E-RAB information that needs to be updated, acquiring that the S-GW has changed, wherein the E-RAB information comprises one or more of an evolved radio access bearer identity (E-RABID), a transmission layer address and TEID information;
   the MME is configured to inform the target-side eNB of whether the S-GW has changed or not in the following way: after successfully completing update of the S-GW, i.e., after successfully completing switch of all or part of GTP-U tunnels, sending to the target-side eNB a message for indicating whether the S-GW has changed or not according to whether the message carries the uplink updated service information.

7. The system according to claim 6, wherein, the target-side eNB is configured to add a new routing relation of the S-GW and then update the GTP-U entity in the following way:
adding new routing information of the S-GW in a rouging information record according to the TEID and transmission layer address; updating the GTP-U entity by updating the TEID at the MME side or the S-GW side in a TEID pair of the E-RAB information; and
the target-side eNB is configured to delete an old routing relation of the S-GW in the following way: if the GTP-U entity is successfully updated, deleting the old routing information of the S-GW from the routing information record.

8. The system according to claim 7, wherein, the target-side eNB is further configured to use updated GTP-U entity and parameters to transmit and receive data.

9. An evolved NodeB (eNB) apparatus for implementing inter-eNB switch, comprising a control-plane sub-system, a user-plane sub-system and a route sub-system, wherein,
the control-plane sub-system is configured to, after completing a switch of a user equipment (UE) from a source-side eNB, when acquiring via a Mobility Management Entity (MME) that a Serving Gateway(S-GW) has changed, notify the route sub-system to add a new routing relation and then notify the user-plane sub-system to update a General Packet Radio Service(GPRS) Tunnelling Protocol User Plane (GTP-U) entity;
the route sub-system is configured to add new routing information of the S-GW according to a notification of the control-plane sub-system;
the user-plane sub-system is configured to update the GTP-U entity according to a notification of the control-plane sub-system, and
wherein,
the user-plane sub-system is further configured to return an update result to the control-plane sub-system after completing update of the GTP-U entity;
the control-plane sub-system is further configured to notify the route sub-system to delete old routing information of the S-GW if judging that the update result returned by the user-plane sub-system is "successful"; and notify the route sub-system to delete added new routing information of the S-GW if judging that the update result is "unsuccessful";
the route sub-system is further configured to delete old routing information of the S-GW or add new routing information of the S-GW in a routing information record.

10. The apparatus according to claim 9, wherein,
the control-plane sub-system is configured to acquire via the MME that the S-GW has changed in the following way: after completion of the switch of the UE from the source-side eNB, sending to the MME a message carrying evolved radio access bearer E-RAB information to be switched for indicating that a Tunnel End Point Identifier (TEID) at the eNB side has changed; if it is checked that the message returned by the MME carries uplink updated service information containing the E-RAB information that needs to be updated, acquiring that the S-GW has changed, and the E-RAB information comprising one or more of an evolved radio access bearer identity (E-RABID), a transmission layer address and TEID information;
the route sub-system is configured to add new routing information of the S-GW in a rouging information record according to the TEID and transmission layer address carried in the message of the control-plane sub-system;
the user-plane sub-system is configured to update the GTP-U entity in the following way: updating the TEID at the MME side or the S-GW side in a TEID pair of the E-RAB information and a target address according to the TEID and transmission layer address carried in the message of the control-plane sub-system.

11. The system according to claim 10, wherein, the user-plane sub-system is further configured to use updated GTP-U entity and parameters to transmit and receive data.

* * * * *